(12) United States Patent
Aalderink et al.

(10) Patent No.: US 8,480,104 B2
(45) Date of Patent: Jul. 9, 2013

(54) HARDENING OF FLEXIBLE TRAILING ARMS

(75) Inventors: Derk Geert Aalderink, Laren (NL); Martinus Jozef Maria Verhoofstad, Apeldoorn (NL)

(73) Assignee: Weweler Nederland B.V., Apeldoorn (NL)

( * ) Notice: Subject to any disclaimer, the term of this patent is extended or adjusted under 35 U.S.C. 154(b) by 46 days.

(21) Appl. No.: 13/130,446

(22) PCT Filed: Nov. 19, 2009

(86) PCT No.: PCT/NL2009/000226
§ 371 (c)(1),
(2), (4) Date: Jul. 6, 2011

(87) PCT Pub. No.: WO2010/059037
PCT Pub. Date: May 27, 2010

(65) Prior Publication Data
US 2011/0254243 A1    Oct. 20, 2011

(30) Foreign Application Priority Data

Nov. 24, 2008    (NL) .................................... 2002248

(51) Int. Cl.
*B60G 3/16*    (2006.01)
*B60G 9/02*    (2006.01)
(52) U.S. Cl.
USPC ............................ 280/124.116; 280/124.131
(58) Field of Classification Search
USPC ................... 280/124.116, 124.128, 124.131, 280/124.17; 148/654
See application file for complete search history.

(56) References Cited

U.S. PATENT DOCUMENTS

| 3,434,707 | A | * | 3/1969 | Raidel | ............................. 267/31 |
| 4,392,668 | A | * | 7/1983 | Mulholland | ................. 280/86.1 |
| 4,763,885 | A | * | 8/1988 | Zamitter | ....................... 267/227 |
| 6,364,973 | B1 | | 4/2002 | Golle et al. | |
| 6,805,369 | B2 | * | 10/2004 | Galazin | ................. 280/124.116 |
| 7,455,306 | B2 | * | 11/2008 | Ramsey et al. | ........ 280/124.128 |
| 2004/0025987 | A1 | * | 2/2004 | Bhagwat et al. | ............. 148/595 |
| 2005/0006869 | A1 | * | 1/2005 | Hughes | ................. 280/124.128 |

FOREIGN PATENT DOCUMENTS

| CN | 1959134 A | 5/2007 |
| JP | 61174333 | 8/1986 |
| JP | 07-179936 | 7/1995 |
| JP | 08-232040 | 9/1996 |
| JP | 2004-262453 | 9/2004 |

OTHER PUBLICATIONS

Brown Metals Company Unit Converter, available at, http://www.brownmetals.com/home.asp?view=mpa&calculate=yes (last visited Oct. 2, 2012).*
John R. Keough; Austempering of Steel; pp. 151-156.
English Machine Translation of CN 1959134.

* cited by examiner

*Primary Examiner* — Jospeh Rocca
(74) *Attorney, Agent, or Firm* — Hoffmann & Baron, LLP

(57) ABSTRACT

The invention relates to a method for manufacturing of a flexible trailing arm for a wheel axle suspension of a vehicle such as a lorry or a trailer. In the method a steel blank is heated. Next, the blank is formed into the desired shape of the trailing arm by means of a suitable forming process. Following that the trailing arm is austempered by cooling it in a warm fluid medium.

17 Claims, 2 Drawing Sheets

HARDENING OF FLEXIBLE TRAILING ARMS

CROSS-REFERENCE TO RELATED APPLICATIONS

This application is the National Stage of International Application No. PCT/NL2009/000226, filed Nov. 19, 2009, which claims the benefit of Netherlands Application No. NL 2002248, filed Nov. 24, 2008, the contents of which is incorporated by reference herein.

FIELD OF THE INVENTION

The present invention relates to the manufacturing of flexible suspension arms for a wheel axle suspension of a vehicle, such as a lorry or a trailer. Such suspension arms are referred to in the art as flexible trailing arms or spring arms.

BACKGROUND OF THE INVENTION

A wheel axle suspension of a trailer or a lorry has a trailing arm on each side of the vehicle which extends substantially in the longitudinal direction of the vehicle. The axle body of the wheel axle is attached to the trailing arms. Each trailing arm is hingedly connected at the front, viewed in the direction of travel of the vehicle, to a bearing bracket which is arranged on the vehicle chassis. Generally, a pneumatic spring is arranged between the trailing arm and the chassis of such a wheel axle suspension. A flexible trailing arm commonly comprises a spring portion, an eyelet at the front end of the spring portion for hingedly mounting the trailing arm to the vehicle, and a mounting portion at the rear end of the spring portion where the wheel axle body can be mounted to the trailing arm.

In the field of manufacturing flexible trailing arms it is common to manufacture the trailing arms by rolling a heated steel blank into a desired shape of the trailing arm. In general this is the shape of a leaf spring. The trailing arm is commonly shaped in several rolling steps, and possibly bending and cutting steps. The forming includes a step where a hinge eyelet is bended on the front end of the rolled flexible trailing arm. These forming steps take place consecutively and the intermediary product is conveyed between consecutive rolling and bending devices. Before each of the rolling and bending steps the trailing arm may be reheated, at least partly. After the product is entirely shaped it is allowed to cool in air to room temperature. The shaped steel arm is given the desired mechanical properties, in particular the desired tensional strength, by hardening the steel which includes reheating the shaped arm such that the steel becomes an austenite structure and subsequently quenching it in an oil bath of about 80° C., whereby the steel obtains a martensite structure with a sufficient tensile strength for the flexible trailing arm to perform its function properly. The quenching in oil is hazardous in view of fire risks. Furthermore the oil is a danger for the environment. The resulting martensite structure after quenching is very hard and brittle, which is undesired for the flexible trailing arm, which in use is subjected to dynamic loads. Therefore it is necessary to temper the steel after hardening it by reheating it again to a moderately high temperature (e.g. at 180-220° C.) and keep it at that temperature for one or two hours.

SUMMARY OF THE INVENTION

The present invention has for an object to provide an alternative method for manufacturing a flexible steel trailing arm.

This object is achieved by a method for manufacturing a flexible trailing arm for a wheel axle suspension of a vehicle such as a lorry or a trailer, comprising the following steps:
heating a steel blank,
forming the blank into the desired shape of the trailing arm by means of a suitable forming process,
austempering the formed trailing arm by cooling it in a warm liquid medium.

By this method is obtained a trailing arm with a substantially bainitic structure, at least at the outside regions. A bainitic structure is more ductile than the martensite structure which is common in flexible trailing arms, whereby a tempering step, which is necessary with a martensite structure, can be omitted, which saves energy use and time.

It is possible that more interior regions of the trailing arm, in particular of the thicker portions of the trailing arm during the austempering are not converted into a bainitic structure but into another structure e.g. pearlite or ferrite structure or a mixture of structures. This may be because said more interior regions are cooled at a different rate than the more exterior regions. The more exterior regions are in use of the trailing arm subjected to the greatest bending loads. It is thus desirable that at least these exterior regions to a certain depth from the outer surface have a bainitic structure. For the interior regions this may be less important since they are subjected to smaller bending loads.

The flexible trailing arm is preferably cooled in a liquid medium with a temperature of about 310° C.

Preferably the flexible trailing arm is cooled in a liquid salt, with preferably a temperature of 310° C.

The method according to the invention can be used with particular advantage when the flexible trailing arm is shaped by means of forging. The trailing arm is then advantageously formed in one forging step, whereby no transport and reheating between forming steps is necessary. Furthermore the forged arm can with particular advantage be submerged directly in the liquid salt after it is ejected or otherwise removed from the forging device. In this manner the formed flexible trailing arm does not have to be reheated to an austenite structure to harden it. The trailing arm is simply formed in one step and then directly out of the forging device austempered in the liquid salt. The resulting trailing arm has a bainitic structure and has a sufficient tensile strength of preferably 1300-1600 N/mm. This specifically advantageous manufacturing method thus provides high quality flexible trailing arms in an efficient way and cost effective way, in which in particular time and energy is saved.

It is also possible to form the trailing arm by means of forging in a plurality of forging steps.

Alternatively it is also possible to form the trailing arm by rolling in the common way, after which the trailing arm is austempered in a liquid salt.

The invention also relates to a flexible trailing arm for a wheel axle suspension of a vehicle such as a lorry or a trailer, wherein the flexible trailing arm comprises steel with a bainitic structure which has a tensile strength of approximately 1300-1600 N/mm.

BRIEF DESCRIPTION OF THE DRAWINGS

The invention will be elucidated in the following description with reference to the drawings in which.

DETAILED DESCRIPTION OF THE INVENTION

Figure 1:
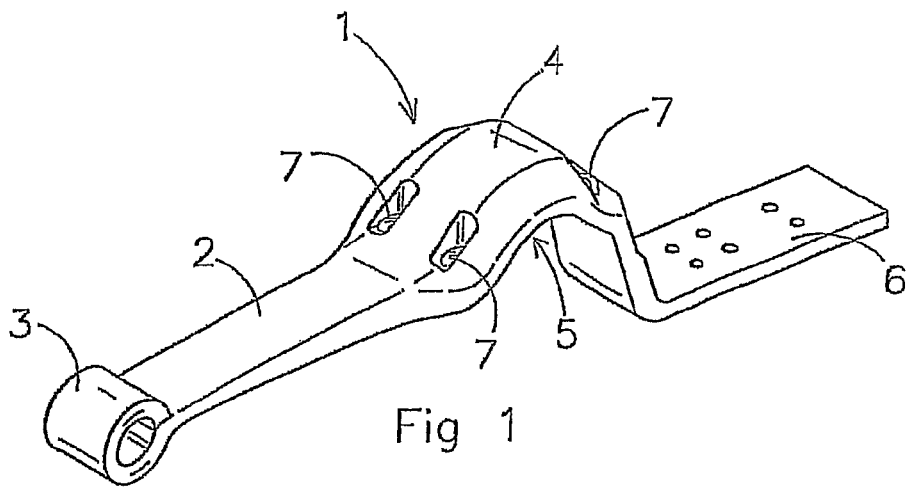
FIG. 1 shows a perspective view from above of a flexible trailing arm for a wheel axle suspension.
Figure 2:
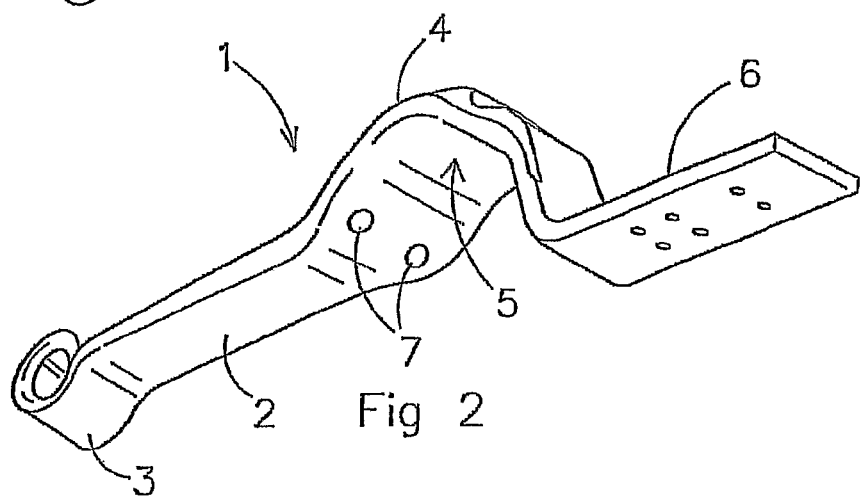
FIG. 2 shows a perspective view from below of the flexible trailing arm of FIG. 1.

In FIG. 1 is shown an exemplary embodiment of a flexible trailing arm 1 for a wheel axle suspension. The shown trailing arm 1 is made from steel and comprises a spring portion 2, a hinge eyelet 3 on the front end of the spring portion 2, a curved portion 4 is formed, which curved portion 4 has a concave contact surface 5 which is directed downward in the example shown. Following on from the curved portion 4, an end portion 6 is formed which is intended for fitting a pneumatic spring thereto.

Figure 4:
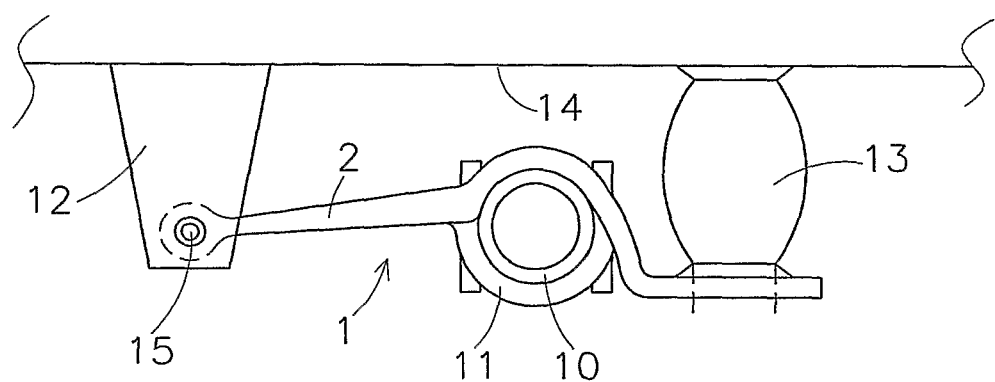
FIG. 4 shows a side view of a wheel axle suspension with the trailing arm of FIGS. 1 and 2.

In FIG. 4 is shown an exemplary wheel axle suspension of for example a trailer or a lorry. On each side of the vehicle, the suspension comprises has a trailing arm 1 which extends substantially in the longitudinal direction of the vehicle. The axle body 10 of the wheel axle is attached to the trailing arm 1 at the mounting portion of the trailing arm 1 by means of a clamping member 11. Each trailing arm 1 is hingedly connected to a bearing bracket 12, which is arranged on the vehicle chassis 14. Thereto a hinge bolt 15 extends through the bearing bracket 12 and the eyelet 3 at the front end of the trailing arm 1. A pneumatic spring 13 or bellows is arranged between a rear end portion 6 of the trailing arm 1 and the chassis 14 of the vehicle.

In a possible alternative embodiment of the wheel axle suspension, the trailing arm may not have an integral end portion 6 for mounting the pneumatic spring 13 to. In such an alternative embodiment the clamping member may for example be provided with a rearwardly extending support arm for mounting the pneumatic spring to.

The spring portion 2 of this arm 1 has a substantially rectangular cross section having a width and a thickness, the width being greater than the thickness. The spring portion 2 could be produced by rolling, but is preferably produced by forging. The curved portion 4 is preferably produced by forging. In this case, four bore holes 7 are provided in the curved portion 4 which serve to insert clamping bolts. This could be U-shaped clamping bolts that engage the axle body (not shown) directly to the concave side of the curved portion 4 of the trailing arm 1 or this could be clamping bolts tensioning the clamping member 11 to the axle body. The eyelet 3 can also be forged.

Figure 3:
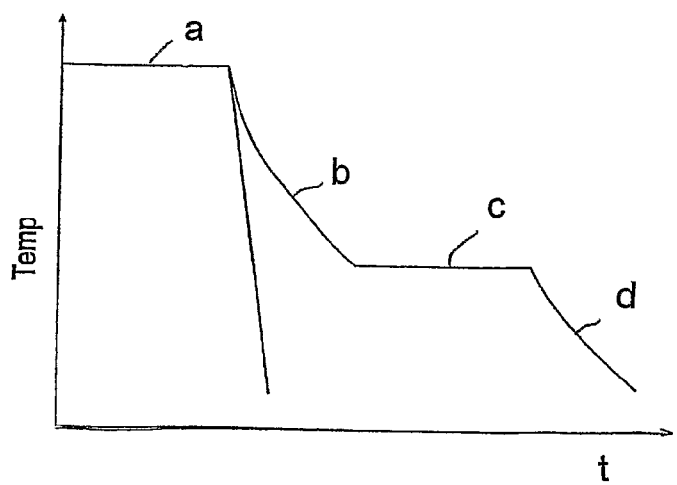
FIG. 3 shows a schematical temperature-time curve during hardening.

Preferably the trailing arm 1 is formed entirely by hot forging. The forging temperature brings the steel to a austenite structure. This is indicated in FIG. 3 with a in the temperature-time curve. The forging heat is thereafter used to harden the steel by submerging the trailing arm 1 in a liquid salt bath. The temperature of the liquid salt is preferably around 310° C. The temperature of the trailing arm thus is lowered from the forging temperature at a to the temperature of the salt at c following the curve b. The trailing arm 1 is held in the liquid salt bath for a certain time such that the steel is converted from a austenite structure to a bainite structure. This is indicated by c in the diagram. After the austempering phase in which bainite is formed, the trailing arm 1 is taken out of the liquid salt bath and is cooled to room temperature in the air, which is indicated by d in the diagram.

The invention claimed is:

1. A flexible trailing arm for a wheel axle suspension of a vehicle, wherein the flexible trailing arm comprises steel with a bainitic structure which has a tensile strength of approximately 1300-1600 N/mm$^2$;

wherein the trailing arm has exterior regions which extend from an outer surface to a certain depth, which exterior regions have a bainitic structure; and wherein the trailing arm has interior regions, located more to the interior than the exterior regions, which have another structure than bainitic structure.

2. The flexible trailing arm according to claim 1, wherein said structure of the interior regions have a pearlite structure.

3. The flexible trailing arm according to claim 1, wherein said structure of the interior regions have a ferrite structure.

4. The flexible trailing arm according to claim 1, wherein said structure of the interior regions have a mixture of pearlite and ferrite structures.

5. The flexible trailing arm according to claim 1, wherein the trailing arm is a forged part.

6. The flexible trailing arm according to claim 1, wherein the trailing arm comprises a spring portion, a hinge eyelet on a front end of the spring portion, and a curved portion on a rear end of the spring portion, which curved portion has a concave contact surface.

7. The flexible trailing arm according to claim 6, wherein the spring portion of the arm has a substantially rectangular cross section having a width and a thickness, the width being greater than the thickness.

8. A flexible trailing arm for a wheel axle suspension of a vehicle comprising a spring portion, a hinge eyelet on a front end of the spring portion, and a curved portion on a rear end of the spring portion, which curved portion has a concave contact surface, wherein the spring portion of the arm has a substantially rectangular cross section having a width and a thickness, the width being greater than the thickness, the flexible trailing arm comprising steel with a bainitic structure, wherein the trailing arm has exterior regions which extend from the outer surface to a certain depth, which exterior regions have said bainitic structure, and wherein the trailing arm has interior regions, located more to the interior than the exterior regions, which have another structure than bainitic structure.

9. The flexible trailing arm according to claim 8, wherein said structure of the interior regions have a pearlite structure.

10. The flexible trailing arm according to claim 8, wherein said structure of the interior regions have a ferrite structure.

11. The flexible trailing arm according to claim 8, wherein said structure of the interior regions have a mixture of pearlite and ferrite structures.

12. A wheel axle suspension for a trailer comprising a flexible trailing arm for a wheel axle suspension of a vehicle comprising a spring portion, a hinge eyelet on a front end of the spring portion, and a curved portion on a rear end of the spring portion, which curved portion has a concave contact surface, wherein the spring portion of the arm has a substantially rectangular cross section having a width and a thickness, the width being greater than the thickness, the flexible trailing arm comprising steel with a bainitic structure, wherein the trailing arm has exterior regions which extend from the outer surface to a certain depth, which exterior regions have said bainitic structure, and wherein the trailing arm has interior regions, located more to the interior than the exterior regions, which have another structure than bainitic structure.

13. A trailer comprising a wheel axle suspension according to claim 12.

14. A flexible trailing arm for a wheel axle suspension of a vehicle, wherein the flexible trailing arm comprises steel with a bainitic structure, wherein the trailing arm has exterior regions which extend from an outer surface to a certain depth, which exterior regions have a bainitic structure, and wherein the trailing arm has interior regions, located more to the interior than the exterior regions, which have another structure than the bainitic structure.

15. The flexible trailing arm according to claim 14, wherein said structure of the interior regions have a pearlite structure.

16. The flexible trailing arm according to claim 14, wherein said structure of the interior regions have a ferrite structure.

17. The flexible trailing arm according to claim 14, wherein said structure of the interior regions have a mixture of pearlite and ferrite structures.

* * * * *